US012749042B2

(12) United States Patent
Segura et al.

(10) Patent No.: US 12,749,042 B2
(45) Date of Patent: Sep. 29, 2026

(54) TECHNIQUES FOR PASSIVE DETECTION OF A STOCK ITEM USING A LOW ENERGY WIRELESS TAG AND REAL-TIME FEEDBACK

(71) Applicant: Wiliot, Ltd., Caesarea (IL)

(72) Inventors: Thaddeus Segura, San Francisco, CA (US); Sumit Saini, San Diego, CA (US); Prasaanth Balakrishnan, San Diego, CA (US)

(73) Assignee: Wiliot, Ltd., Caesarea (IL)

( * ) Notice: Subject to any disclaimer, the term of this patent is extended or adjusted under 35 U.S.C. 154(b) by 302 days.

(21) Appl. No.: 18/521,279

(22) Filed: Nov. 28, 2023

(65) Prior Publication Data

US 2025/0173670 A1 May 29, 2025

(51) Int. Cl.
*G06Q 10/087* (2023.01)
*G06K 19/07* (2006.01)

(52) U.S. Cl.
CPC ....... *G06Q 10/087* (2013.01); *G06K 19/0708* (2013.01)

(58) Field of Classification Search
CPC ......................... G06Q 10/087; G06K 19/0708
See application file for complete search history.

(56) References Cited

U.S. PATENT DOCUMENTS

| | | | | |
|---|---|---|---|---|
| 7,889,686 | B1 * | 2/2011 | Chang | H04L 65/1095 455/445 |
| 2014/0201042 | A1 * | 7/2014 | Meyer | G01G 19/4144 705/28 |
| 2016/0212797 | A1 * | 7/2016 | Scherping | G08G 1/162 |
| 2017/0353905 | A1 * | 12/2017 | Kumar | H04W 48/20 |
| 2018/0293871 | A1 * | 10/2018 | Malinofsky | H04W 40/244 |
| 2019/0138975 | A1 * | 5/2019 | Zuberi | G06Q 10/087 |
| 2019/0179003 | A1 * | 6/2019 | Trivelpiece | G06K 7/10475 |
| 2021/0024112 | A1 * | 1/2021 | Ting | B62B 3/10 |
| 2022/0245369 | A1 * | 8/2022 | Groomes | G06Q 10/087 |
| 2022/0416839 | A1 * | 12/2022 | Matsushita | H04B 1/1018 |
| 2025/0086584 | A1 * | 3/2025 | Hudson | G06Q 10/087 |

* cited by examiner

*Primary Examiner* — Florian M Zeender
*Assistant Examiner* — Kimberly S. Bursum
(74) *Attorney, Agent, or Firm* — M&B IP Analysts, LLC

(57) ABSTRACT

A system and method for passively determining and placing a stock item using an internet of things (IoT) tag is presented. The method includes receiving, during a predefined time window, data packets from a gateway, wherein the received data packets include at least a sensing signal from a plurality of IoT tags; identifying a first IoT tag from the plurality of IoT tags having a signal strength indicator above a predetermined threshold rank, wherein the first IoT tag is attached to a stock item; identifying the stock item, using a machine learning algorithm on the received data packets of the identified first IoT tag; and causing determination of a placement point to place the identified stock item.

17 Claims, 7 Drawing Sheets

TECHNIQUES FOR PASSIVE DETECTION OF A STOCK ITEM USING A LOW ENERGY WIRELESS TAG AND REAL-TIME FEEDBACK

TECHNICAL FIELD

The present disclosure generally relates to internet of things (IoT) tags, including low-energy sensing tags, and more particularly, for passive detection of items and real-time feedback.

BACKGROUND

Determining and monitoring items or group of items are important to determine, for example, an inventory level, misplacement of items, theft detection, and so on. The products or items are typically placed on shelves and/or containers, but once placed, there are no efficient solutions to monitor the items for efficient inventory management. This problem is related to many industries including, but not limited to, retail, manufacturing, medical, and more.

Current solutions for monitoring items, specifically small-size objects, typically require manual labor or complex infrastructure. For example, one solution would require a person to physically identify all items at their locations. This would require expensive labor and may be vulnerable to human errors. An automated solution may include cameras or other tracking devices. However, such a solution would require a line of sight between the items and the camera(s) and are cumbersome to install and maintain. Further, the tracking cameras are ineffective when the items are moved from one location to another where there is no coverage by the tracking camera. The processing of images requires complex algorithms and extensive computing resources. In addition, tracking cameras are ineffective for items in generic containers and boxes where items are indistinguishable without individual checking.

Other solutions suggest tracking items using radio-frequency identification (RFID) where an RFID tag is placed on each item. An RFID tag includes a tiny radio transponder, a radio receiver, and a transmitter. When triggered by an electromagnetic interrogation pulse from a nearby RFID reader device, the tag transmits digital data, usually an identifying inventory number, back to the reader. This number can be used to track inventory goods. However, RFID technology has downfalls in that monitoring can fail when the tag does not transmit a signal, or such signal is not received. RFID technology often requires a specialized scanner that may suffer from accuracies, particularly in areas that are densely populated.

In addition to determining and monitoring of items, methods to rapidly and accurately stock items on shelves and/or containers are desired for efficient inventory management. Item placement in, for example, stores, warehouses, and the like, are largely dependent on manual labor. For example, one common practice to determine a designated placement point for an item requires manual searching of large directories. With the abundance of products and their variety in, for example, size, type, brand, and more, manual look-up, even with digital directories, is not only time consuming but can result in misplacement of items due to missing information or human errors.

Another common solution to item placement is a bar code system. The bar code system requires a person to manually scan the item or a group of items that are in a line of sight. Although some automation is provided by bar code scanning, such a system still requires active participation of a person that results in delays in item placements. Moreover, current solutions are multi-step processes that prevent seamless inventory management.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for passively determining and placing a stock item using an internet of things (IoT) tag. The method comprises: receiving, during a predefined time window, data packets from a gateway, wherein the received data packets include at least a sensing signal from a plurality of IoT tags; identifying a first IoT tag from the plurality of IoT tags having a signal strength indicator above a predetermined threshold rank, wherein the first IoT tag is attached to a stock item; identifying the stock item, using a machine learning algorithm on the received data packets of the identified first IoT tag; and causing determination of a placement point to place the identified stock item.

Certain embodiments disclosed herein also include a non-transitory computer readable medium having stored thereon causing a processing circuitry to execute a process, the process comprising: receiving, during a predefined time window, data packets from a gateway, wherein the received data packets include at least a sensing signal from a plurality of IoT tags; identifying a first IoT tag from the plurality of IoT tags having a signal strength indicator above a predetermined threshold rank, wherein the first IoT tag is attached to a stock item; identifying the stock item, using a machine learning algorithm on the received data packets of the identified first IoT tag; and causing determination of a placement point to place the identified stock item.

Certain embodiments disclosed herein also include a system for passively determining and placing a stock item using an internet of things (IoT) tag. The system comprises: a processing circuitry; and a memory, the memory containing instructions that, when executed by the processing circuitry, configure the system to: receive, during a predefined time window, data packets from a gateway, wherein the received data packets include at least a sensing signal from a plurality of IoT tags; identify a first IoT tag from the plurality of IoT tags having a signal strength indicator above a predetermined threshold rank, wherein the first IoT tag is attached to a stock item; identify the stock item, using a machine learning algorithm on the received data packets of the identified first IoT tag; and cause determination of a placement point to place the identified stock item.

Certain embodiments disclosed herein include the method, non-transitory computer readable medium, or system noted above, further including or being configured to perform the following steps: causing initiation of a notification via a notification device, wherein the notification device is located at the determined placement point for the stock item.

Certain embodiments disclosed herein include the method, non-transitory computer readable medium, or system noted above, wherein the notification is output using at least one of: light and sound.

Certain embodiments disclosed herein include the method, non-transitory computer readable medium, or system noted above, further including or being configured to perform the following steps: selecting a subset of IoT tags from the plurality of IoT tags, wherein the subset of IoT tags includes at least one IoT tag that received at least a predetermined number of data packets within the predefined time window; and ranking the at least one IoT tag of the subset of IoT tags based on the signal strength of the at least one sensing signal.

Certain embodiments disclosed herein include the method, non-transitory computer readable medium, or system noted above, wherein the first IoT tag from the plurality of IoT tags has a strongest signal strength indicator from the ranked at least one IoT tag of the subset of IoT tags.

Certain embodiments disclosed herein include the method, non-transitory computer readable medium, or system noted above, wherein the at least a sensing signal includes at least one of: a frequency word, a received signal strength indicator (RSSI), and a digitally controlled oscillator (DCO) signal.

Certain embodiments disclosed herein include the method, non-transitory computer readable medium, or system noted above, wherein an IoT tag of the plurality of IoT tags is a battery-less IoT tag harvesting energy from a radio frequency (RF) from the gateway.

Certain embodiments disclosed herein include the method, non-transitory computer readable medium, or system noted above, wherein the gateway is a portable device configured to communicate with the plurality of IoT tags via a Low-Energy short range communication protocol.

Certain embodiments disclosed herein include the method, non-transitory computer readable medium, or system noted above, wherein the gateway is in proximity to the first IoT tag that is attached to the stock item.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
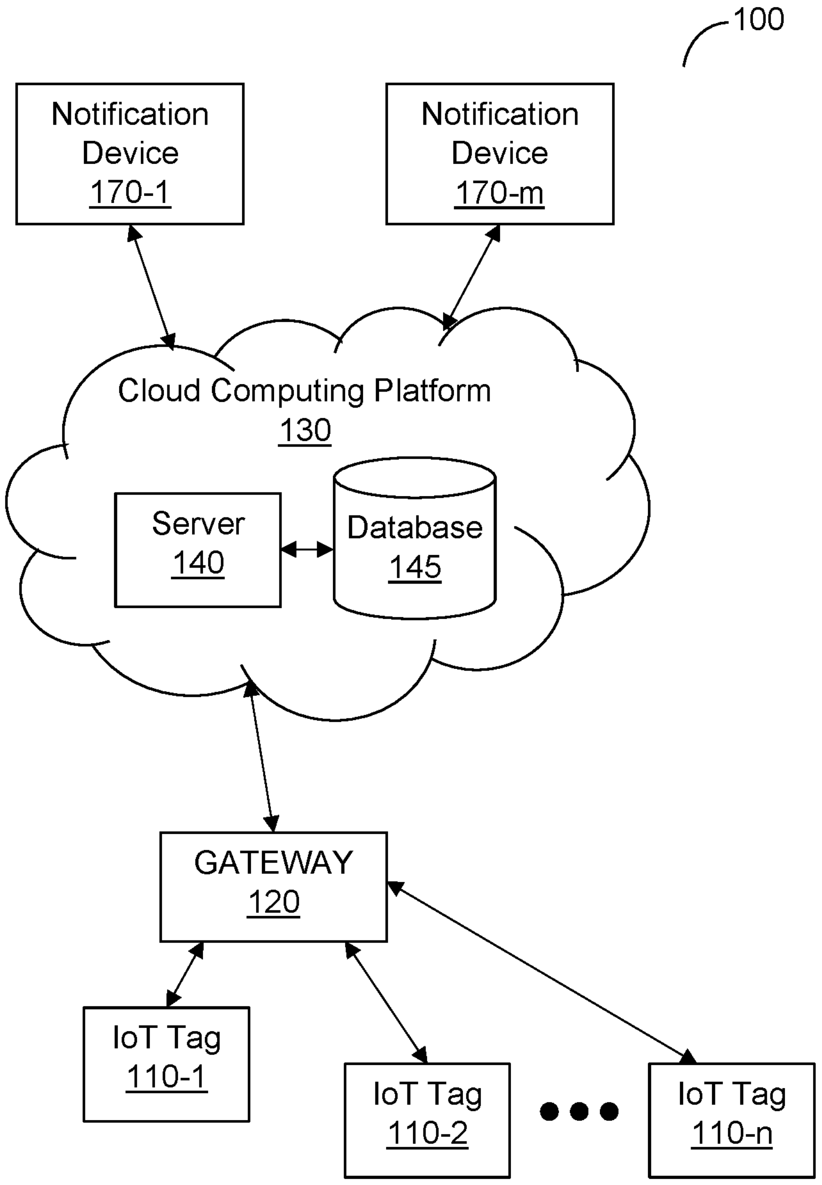
FIG. 1 is a network diagram of a low-energy communication system illustrating the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide techniques for passive detection and placement of an item using a low-energy internet of things (IoT) tag. An integrated approach to connect various devices and/or systems that participate through a journey of a stock item from pick-up to placement, and even thereafter for inventory management and tracking, is presented. The harmonious integration of various embodiments disclosed herein enables passive detection of a stock item followed by automatic guidance to stock the item in a designated placement point, in real-time. It should be noted that the embodiments described herein streamline inventory management of items with improved accuracy and efficiency.

Low-energy IoT devices are deployed on surfaces of, for example, an item, a box, a pallet, and the like, having the stock item to be placed. The IoT devices are configured to transmit sensing signals that suggest conditions and changes in its vicinity. At least an algorithm, such as a machine learning algorithm is applied to one or more data in the data packets as well as associated parameters received for the IoT devices in order to accurately determine the stock item. Furthermore, an external system (e.g., the feedback system) is caused to immediately generate and output notifications for the identified stock item. The generation and output of the notification explicitly and accurately indicate the placement point for the stock item in real-time (e.g., within few minutes) while the stock item with the IoT device is transported, eliminating any action or delays.

Currently implemented methods for inventory management and stocking require large amounts of manual labor from, for example and without limitation, identifying items, looking up location, checking placement point, and more. Such manual labor is not only labor and cost intensive, but also inefficient and prone to errors, for example misplacement of items. Even with the advancement of technology to allow automation in portions of such processes, for example, identifying the stock item by scanning a bar code, complete automation as described herein is not yet possible. The embodiments disclosed herein provide an automated process from item identification, placement point determination, guidance, and more that is distinct from manual methods and cannot be performed by a person. Particularly, passive detection of items without requiring an action step, regardless of being performed by a person or a computer, is enabled by the IoT tags and analyses disclosed herein. To this end, the embodiments disclosed herein utilize a low-energy IoT device (or tag) to provide efficient item determination and placement at low cost of energy.

Moreover, it has been identified that using RFID technology in inventory management faces challenges in accuracies due to multiple RFID devices that are densely populated in the environment. The disclosed embodiments employ a portable gateway device that is transported in conjunction with the IoT tag to effectively identify and receive signals from the applicable IoT device associated with the stock item. The gateway not only communicates precisely with the IoT devices to receive and relay sensing signals, but also provides energy to power-up the low-energy IoT devices for efficient power conservation and usages.

According to the disclosed embodiments, multiple devices and/or systems may operate independently and yet harmoniously integrated to work in combination for efficient identification and placement of the stock item. Such modular characteristics of the system enable scaling in, for example, but not limited to, size, dimension, environment, and the like, as needed to add versatility of the system. In addition, the various components described herein may be readily integrated with existing infrastructures for further utilization in, for example, inventory software, inventory tracking, recording, analytics, and more. To this end, it should be appreciated that the system disclosed herein may be expanded and utilized in other applications.

That is, the system may be easily expanded and utilized in other applications. In addition, the various disclosed embodiments that include multiple devices and systems working in combination are modular to allow each component (e.g., IoT tag, server, feedback system, etc.) to operate independently and as a harmonious integration. In addition, the various disclosed embodiments may be easily integrated. Allow components described herein to be integrated with existing infrastructures. Scalable to size, dimension as needed.

FIG. 1 is an example schematic diagram of a low-energy communication system 100 utilized to describe the various embodiments. The system 100 includes a plurality of wireless Internet of Things (IoT) tags 110-1 through **110-*n* (collectively referred to as an IoT tag 110 or IoT tags 110, wherein n is an integer greater than 1), a gateway 120, a cloud computing platform 130, and a plurality of notification devices (collectively referred to as a notification device 170 or notification devices 170, wherein m is an integer greater than 1). The system 100 also includes at least one server 140 that may be deployed in the cloud computing platform 130. The server 140 may be realized as a physical machine, a virtual machine, or a combination thereof. An example block diagram of the server 140 is provided in FIG. 7**.

The cloud computing platform 130 may be a public cloud, a private cloud, a hybrid cloud, or a combination thereof. A database 145 may be deployed in the cloud computing platform 130 and may be connected to the server 140. The database 145 may store events generated by server 140, identifiers (IDs) of IoT tags 110, and other signals.

Figure 6:
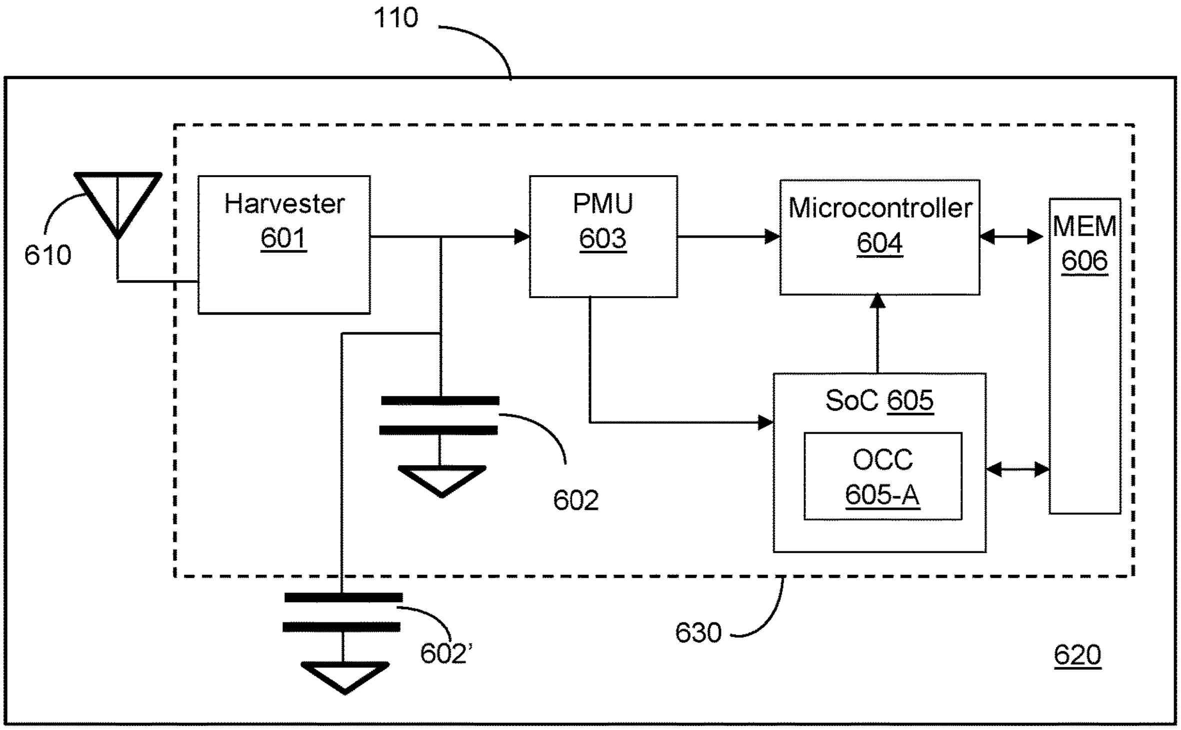
FIG. 6 is a schematic diagram of a wireless IoT tag according to the disclosed embodiments.

In an embodiment, the IoT tag 110 is a battery-free IoT tag as discussed in FIG. 6. The IoT tags 110 are configured to operate at ambient conditions. Also, communication amongst each IoT tag 110 and the gateway 120 may be performed using a low-energy communication protocol. The communication between the cloud computing platform 130 and the gateway 120 and/or the notification device 170 is over, for example, the Internet. An IoT tag 110 may include a printed battery. In an example embodiment, the low-energy communication protocol includes a Bluetooth Low Energy (BLE) protocol, which are short-wavelength radio waves operating at a range of about 2.40 to 2.485 MHZ, and commonly used among portable wireless devices.

In an embodiment, the IoT tags 110 are placed on a surface of, for example, but not limited to, a cart, a pallet, a case, a box, a container, an item, and the like. The IoT tag 110 may be glued, attached, or fastened to the surface. For example, the form factor of an IoT tag 110 may be a sticker that may be applied to an item. The number of IoT tags 110 on the surface depends on, for example, but not limited to, size, type, shape, and the like, and any combination thereof, of the surface. The items may be any type of product or object ranging from groceries to fashion items. For example, the IoT tag 110 is attached to shoe boxes in a warehouse. In another example, the IoT tag 110 is attached to a case of a dozen honey bottles that are transported and displayed at a designated placement point at the storefront. In an example embodiment, at least one of the IoT tags 110 is positioned on a stock item that is handled by, for example, a store worker, to be placed on an assigned placement point that is not yet known.

The notification device 170 is a device, component, or the like, that is capable of receiving and displaying notifications. The notification device 170 may include, for example, but not limited to, a display, a light emitting diode (LED), a speaker, an augmented or virtual reality interface, and the like, and any combination thereof, in order to output the notification to a representative and/or its surroundings. In an example embodiment, the notification device 170 is a device attached to a shelf, rack, or the like, in a particular environment such as, but not limited to, a store, a warehouse, and the like. The notification device 170 is attached to a specific placement point on the shelf for stocking and display of the item. As an example, the notification device 170 is a digital label including product information (e.g., name, price, weight, etc.) for each product in a grocery store. In an embodiment, the notification device 170 may be an electronic shelf label (ESL) used by retailers for displaying product information, which often are automatically updated or changed by a central server. The notification device 170 indicates a designated placement point for the product in the grocery store. The notification device 170 may be associated to a particular product (or item), which may be modified through a third-party system of the particular environment, for example, the store. In an embodiment, the notification device 170 may be part of a feedback system (not shown) that is configured to generate notifications.

In some implementations, a user device (not shown) such as, and without limitation, a personal computer (PC), a smartphone, a laptop, a user terminal, and the like, may be connected to the server 140 and/or the feedback system to receive and display a report. The report may include, for example, the item information, the placement point, and the like, and any combination thereof.

According to the disclosed embodiments, item information is passively determined from signals received from an IoT tag 110 affixed to a specific item. The determination is performed for signals received during a predefined time window such as, but not limited to, 30 seconds. The IoT tag 110 signals are relayed to the server 140 via the gateway 120 that is in proximity to the IoT tag 110. In some implementations, an item may be affixed with multiple IoT tags 110. In such scenarios, a collective analysis of a plurality of signals received from the multiple IoT tags may be performed. It should be noted that the information (or identification) of the item is determined passively through IoT tag signals without requiring any action such as, and without limitation, scanning, look-up, manual searching, or the like. That is, the stock item is determined automatically, based on the signals transmitted by the IoT tag 110 on the stock item.

The server 140 is configured to analyze sensing signals that are transmitted by the IoT tags 110. The gateway 120 is configured to receive sensing signals from the IoT tags 110, encapsulate the received signals together with additional data (e.g., metadata) in data packets, and transmit the data packets to the cloud computing platform 130 to be processed by the server 140. The gateway 120 communicates with the IoT tags 110 over low-energy communication protocol (e.g., BLE), and with the cloud computing platform 130, for example, over the Internet. The server 140 may be deployed on-premises, and in such embodiments, the gateway 120 may communicate with the server 140 over the network.

The gateway 120 may be any edge computing device, such as, but not limited to, a laptop, a tablet computer, a smartphone, a PC, and the like. The gateway 120 is configured to send, for example, RF waves, to power up (or charge) the IoT tags 110, which may return sensing signals in response. In an embodiment, the gateway 120 is a portable device that may be handled together with the stock item with the IoT tag 110. As an example, a store worker may carry the gateway 120 and the item affixed with the IoT tag 110 in order to effectively place the stock item at the designated placement point in a store. In an example embodiment, the gateway 120 is a stand-alone device.

In some implementations, a gateway 120 may be installed with an agent or application (not shown in FIG. 1) in a standard computing device (such as a PC, a laptop, a tablet computer, a smartphone, and the like). The agent, when executed, is configured to control the communication between the IoT tag 110 and the server 140. An example implementation of a gateway 120 is discussed with reference to FIG. 6.

It should be noted that the gateway 120 is a local edge computing device that is proximal to the IoT tag 110 signals thereby reducing latency issues between the IoT tags 110 and the gateway 120. It should be further noted that the gateway 120 may receive signals from a plurality of IoT tags within a communication range, which may include IoT tags that are associated with other items in the surrounding. In some implementations, the gateway 120 may be configured to analyze at least a portion of the IoT tag 110 sensing signals to determine the stock item attached thereon.

In an embodiment, an IoT tag 110 senses a particular radio frequency (RF) activity caused by an interference to the ambient RF field, which results in a change in a calibration frequency of the IoT tag 110, and such a change is translated into a sensing signal. The sensing signal may include a frequency word, a received signal strength indicator (RSSI), a digitally controlled oscillator (DCO) signal, and the like, or any combination thereof.

An RSSI is a measurement of the power present in a received radio signal. For example, the RSSI value of an IoT tag (e.g., 110-1) that is closely located to a gateway 120 is greater than the RSSI value of an IoT tag (e.g., 110-2) that is further away from the same gateway 120.

A frequency word is measured by an IoT tag 110 depending on a frequency calibration of the IoT tag 110. In an embodiment, changes to the surrounding environment of an IoT tag 110, such as, but not limited to, the number of items, random objects, type or property of items, proximity to gateways or other objects, and temperature, change the value detected by the IoT tag 110 from synchronization, thereby changing the value of the frequency word. A value of frequency words may be measured as dBC/Hz, where the dBC unit is decibels relative to the carrier. In an example embodiment, the frequency calibration is discussed in more detail with reference to FIG. 6.

A DCO signal is a control signal of the internal capacitor that is used to calibrate the internal capacitor and changes its capacitance value to counteract the capacitance that a new material imposes. That is, the IoT tag 110 senses whether the transmission frequency is corrected and, if not, the DCO is adjusted to the main frequency of the transmission. When the surrounding that is proximate to a tag 110 is modified, the tag 110 recalibrates itself to the same transmission frequency by changing the capacitance value of its internal capacitor. In an embodiment, the transmission frequency may be one of the channels of the BLE transmission protocol. It should be noted that other low-energy communication protocols are also applicable.

As explained in more detail below, an IoT tag 110 is configured to send sensing signals, and other information to a gateway 120. A gateway 120 is further configured to relay the combined information received from the IoT tag 110 to the server 140. It should be further noted that the gateway 120 may receive signals transmitted by multiple IoT tags 110 including IoT tags 110 that are not on or relevant to the stock item.

In an embodiment, a data packet transmitted by a gateway 120 to the server 140 includes, without limitation, a sensing signal, an identifier (ID) of an IoT tag 110, and an identifier (ID) of the gateway 120. In an embodiment, the ID of the IoT tag 110 is a unique identifier (ID) that is set during the production of the IoT tag 110. The signals sent by the IoT tag 110 are received at a gateway 120, which, in turn, is configured to periodically send the data packets to the server 140.

In an embodiment, the IoT tags 110 transmit signals intermittently rather than continuously with periods of silence. Such intermittent transmission of signals is implemented to conserve energy at the IoT tags 110, which may be, but is not limited to, battery-less IoT tags 110. In an embodiment, the IoT tag 110 may transmit signals upon receiving power-up signals from the gateway 120. In a further embodiment, the ID of the gateway 120 is a unique identifier (ID) identifying the gateway 120 from which the data packets are relayed to the server 140. It should be noted that a single gateway 120 is shown in FIG. 1 for simplicity and does not limit the scope of the disclosed embodiments. In an example implementation, a worker in a retail space may each carry a portable gateway 120 that communicates with one or more IoT tags 110 in its vicinity and the cloud computing platform 130.

As noted above, the gateway 120 is a portable device that may be readily carried to different locations in conjunction with the IoT tagged stock item for accurate item determination and placement. In such a case, the data packets for the corresponding IoT tag may include identical IDs of the gateway 120 and relatively consistent sensing signal values (or strengths) since the IoT tag and the gateway remain in proximity and are transported together.

According to the disclosed embodiments, the server 140 is configured to perform further processing on the received data packets to identify the item to be stocked (i.e., the stock item). The server 140 identifies the first IoT tag (e.g., 110-1) that is associated with the stock item from the one or more IoT tags 110 from which data packets were also received from. The first IoT tag 110 is the IoT tag 110 that is affixed to the stock item. At least one algorithm, such as a machine learning algorithm, is applied to the data packets received for at least the first IoT tag 110. The machine learning processes may be based on one or more classifiers, trained or self-trained, to classify sensing signals and identify the stock item. That is, the machine learning processes may include, for example, supervised, self-supervised, semi-supervised, or unsupervised machine learning classifier. In an embodiment, feedback data may be collected to further train the machine learning models for improved accuracy.

In an embodiment, the server 140 may utilize aggregated sensing signals collected within a predetermined time window (e.g., 30 seconds) and determine parameters including, for example, but not limited to, a number of received data packets, a packet rate, an RSSI, and the like, and any combination thereof. It should be noted that the aggregation of sensing signals may improve accuracy by eliminating noise and/or anomalies. In some embodiments, other information such as, but not limited to, temperature, motion indicator, and the like of the IoT tag's 110 surroundings may be derived from the IoT tag 110 sensing signals and further, utilized to determine the stock item. In some implementations, a statistical function is applied to the received sensing signals from each tag. Such statistical functions may include an average value, a maximum value, a minimum value, and the like.

As noted above, the IoT tags 110 are wireless sensing devices harvesting over-the-air energy. A change in the IoT tag 110 or its surroundings would trigger a change in its calibration frequency, and hence, in a frequency word transmitted by the IoT tag 110. It should be emphasized that an IoT tag 110 does not generate an explicit signal indicating the stock item or changes in the IoT tag surroundings. The tagged stock item identification and/or information are derived based on the changes in the values of, for example, the frequency words, and the like, from transmitted sensing signals.

According to the disclosed embodiments, the server 140 is configured to cause determination of a placement point and generation of a notification via a notification device 170 at the placement point. The placement point is a designated location, for example, on a shelf, for the identified stock item. The server 140 sends, for example, information of the identified IoT tag 110, associated information, and the identified stock item to a feedback system (not shown) to initiate output of the notification at the placement point. The output of the notification via the notification device 170 provides explicit guidance to the placement point. It should be noted that the passively collected IoT tag 110 sensing signals are translated to real-time determination and indication to allow accurate and efficient placement of stock items in its designated location. The embodiments disclosed herein allow harmonious and seamless integration of item identification, transport, placement, and management that may otherwise be performed in isolated events by disconnected components and/or systems.

In an embodiment, the notification devices 170 may be part of a feedback system (not shown) that is configured to receive item information and generate real-time notifications at the determined placement point for the item. The notifications are output via the notification device 170 in real-time, for example, as a blinking LED, flashing lights, beeping sound, and the like, and any combination thereof. The feedback system is deployed at the cloud computing platform 130, at a separate cloud computing platform, or both. The feedback system receives item information (e.g., product identification, IoT tag ID, associated data, etc.) from the server 140 and determines a designated placement point for the received item. The communication between the server 140 and the feedback system may be via an application programming interface (API). The connection between the notification device 170 and the cloud computing platform 130 is over the Internet. The feedback system may be associated with, for example, a retail space, and may include information on various items and their respective placement points. In some implementations, the placement point determined for the stock item may be sent to the cloud computing platform 130 and stored in the database 145. The stored placement point may be retrieved for rapid generation and output of notification at the corresponding notification device 170. In an embodiment, the notification device is an electronic shelf label (ESL) that displays product information (e.g., price, name, promotions, etc.) at, for example and without limitation, a storefront.

Figure 2:
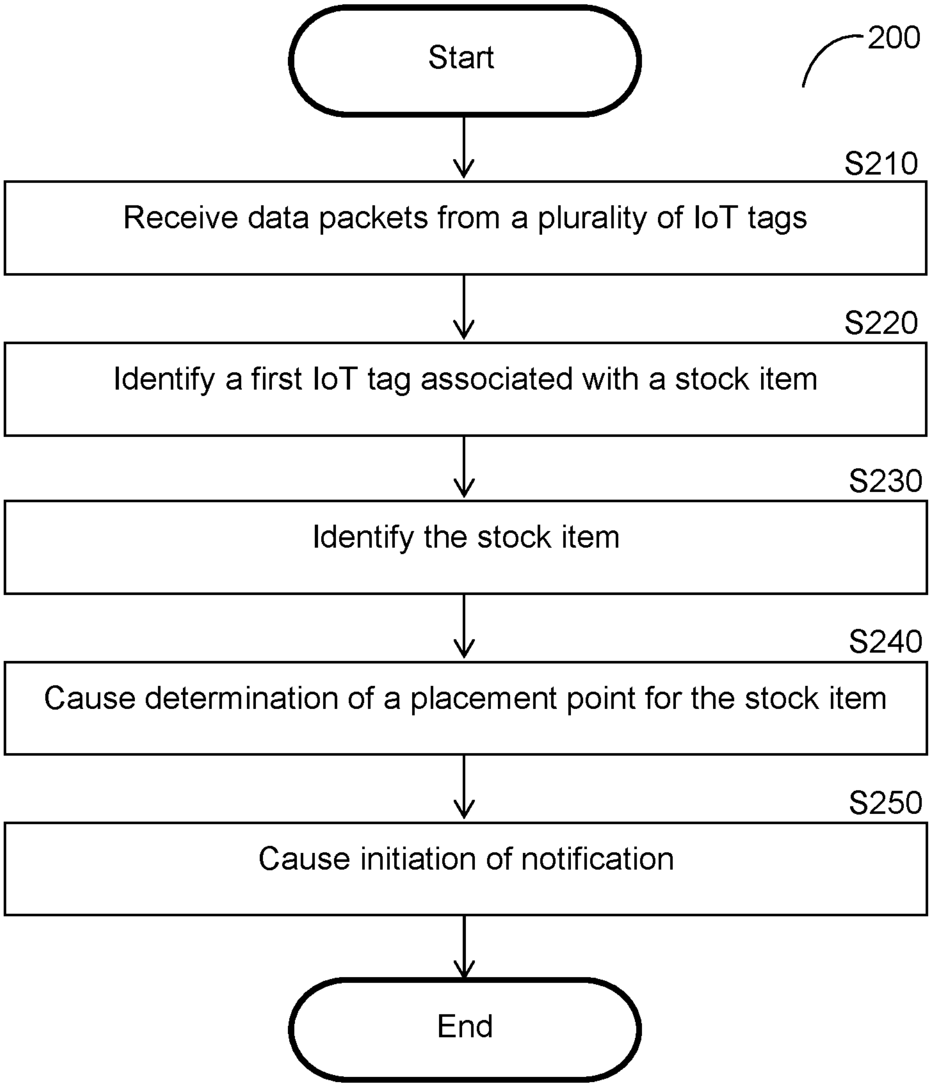
FIG. 2 is a flowchart illustrating a method for determining and placing a stock item according to an embodiment.

FIG. 2 is an example flowchart illustrating a method for determining and placing a stock item according to an embodiment. In an embodiment, the IoT tag (e.g., the IoT tag 110, FIG. 1) is attached to, for example, an item, a box, a pallet, and the like, and at least one IoT tag is associated with a specific item for stocking (i.e., the stock item). The association of the IoT tag with the specific item may be performed prior to the method at, for example, a distribution center. The method described herein may be performed by a server, such as the server 140 in FIG. 1, and may be simultaneously performed for one or more gateways (e.g., the gateway 120, FIG. 1) that each communicate with at least one IoT tag.

At S210, data packets are received for at least one IoT tag. The data packets are received via a gateway (e.g., the gateway 120, FIG. 1) that receives sensing signals from each IoT tag. The sensing signals include, for example, but not limited to, a frequency word, a received signal strength indicator (RSSI), a digitally controlled oscillator (DCO) signal, and the like, and any combination thereof. The gateway may add additional data (or metadata) such as gateway ID, and the like, to the sensing signals to create data packets. The gateway and the IoT tag may utilize a low-power communication protocol (e.g., BLE). In an embodiment, the gateway is a portable device that is in transport with the stock item (and its IoT tag) until the stock item is placed in its designated placement point.

The data packets may be received intermittently for a predefined time window (e.g., 30 seconds). In an embodiment, additional parameters such as, but not limited to, a packet rate, a number of packets received within the predefined time window, and the like, may be determined for each IoT tag. In an example embodiment, the data packets received within the predefined time window may be aggregated for each IoT tag for further analysis.

At S220, a first IoT tag that is associated with a stock item is identified. The first IoT tag is one of the at least one IoT tags and is affixed to the stock item. The received data packets may include data packets from IoT tags that are not affixed to the stock item but are located within reachable range from the gateway. To this end, the first IoT tag that is on the stock item and in transport with the gateway is identified based on the received data packets. At least one parameter of the data packets is utilized to determine the first IoT tags and is further described with respect to FIG. 3 below. In an example embodiment, the first IoT tag may be an IoT tag closest to the gateway, and thus, include a largest RSSI value amongst the received data packets. In another example embodiment, one or more IoT tags may be identified as the first IoT tag affixed to the stock item. In yet another example embodiment, the first IoT tag may be identified upon repeatedly identifying the same IoT tag for consecutive time windows. As an example, an IoT tag (e.g., 110-2) is identified as the first IoT tag upon identifying the same IoT tag (e.g., 110-2) for three consecutive 30 second time windows.

At S230, the stock item is identified based on the data packets. At least one algorithm, such as a machine learning algorithm, is applied to sensing signals and parameters in the data packets received of the first IoT tag. The machine learning algorithm may be trained to identify the stock item based on data packets received within the predefined time period (e.g., 30 seconds). In an example embodiment, the machine learning model may be trained using items for a particular environment, for example, grocery store, clothing store, storefront, backroom, warehouse, and the like. In some implementations, a supervised learning approach may be taken using labeled training datasets including, for example, but not limited to, sensing signals, additional information (or metadata) added by the gateway, and the like, and any combination thereof. The training datasets may be gathered through simulated stocking runs. A feature engineering may be applied to enhance the raw data in the data packets received for the IoT tags. As noted above, the machine learning model may continuously learn and update to maintain performance. The trained machine learning model may be employed in various new environments due to its capability to continuously learn and update using feedback data that are returned. In some embodiments, the stock item may be identified from the IoT tag ID of the identified first IoT tag. For example, a certain IoT tag ID may be associated with a unique stock item and such information may be readily available for identification. It should be noted that identification of the stock item using the IoT tags allow passive detection of the stock item that is closely positioned and/or transported together with the gateway in the environment. It should be further noted that detection of the stock item is performed in real-time or near real-time by processing data packets received within a short time window.

At S240, determination of a placement point for the stock item is caused. The identified stock item and/or data associated with the identified first IoT tag is sent to a feedback system to determine the designated placement point for the stock item. The feedback system may be an external system that communicates with the server (e.g., the server 140, FIG. 1) via an API over the network. The placement point may be determined by, for example, looking up prescribed placement point of the product in a particular space. The prescribed placement point for items in the particular space may be maintained by, for example, an entity of the feedback system and/or the particular space. The feedback system may communicate with a plurality of notification devices distributed in the environment. As an example, the notification device may be a digital label positioned at a specific area, aisle, shelf, spot on shelf, and the like, and associated with a specific product. In another example, the IoT tag ID of the identified first IoT tag may be used to search for the predetermined placement point. For example, tag #1234 that is identified is used to determine that the stock item is a case of 24 oz Cheerios. Here, the placement point for the 24 oz Cheerios may be caused to be determined as Section A, Aisle 11, Section 14, Facing 6 in the grocery store.

At S250, an initiation of a notification is caused. Sending the information of the identified stock items further causes initiation of the notification on a unique notification device (e.g., the notification device 170, FIG. 1) at a determined placement point. Upon determining the placement point for the stock item, the notification is generated and sent to the notification device. The notification device at the placement point may output the notification using, for example, but not limited to, blinking of LED, flashing display, a beeping sound, change in display color or tone, or the like, and any combination thereof. In other implementations, the notification may be dispatched via augmented or virtual reality interfaces of the feedback system. The notification is caused to be initiated to provide immediate feedback (e.g., visibly, audibly, etc.) to guide transport and placement of the stock item, for example, at the shelf with a blinking notification device. In some implementations, unique output may be caused between consecutively identified stock items (or IoT tags) in order to distinguish placement point notifications between one stock item and another. For example, a red light may be output for one stock item and a green light may be output for the next stock item identified for stocking.

In an embodiment, the passive detection of the stock item to causing the notification at the notification device may be performed within few minutes. As an example, the designated notification device on the determined placement point may be initiated while the stock item is selected and transported out into the store space. It should be noted that such real-time detection of the stock item and placement point, as well as the immediate feedback output is performed automatically without any manual intervention required by using the gateway and IoT tags. Moreover, the harmonious integration and connectivity between the various disclosed embodiments allow seamless, real-time utilizations for efficient and accurate inventory management.

It should be noted that, for simplicity, the method was described with respect to a single IoT tag being affixed to the stock item. However, the stock item may be attached with one or more IoT tags based on, for example, the size of the stock item, without departing the scope of the disclosed embodiments.

Figure 3:
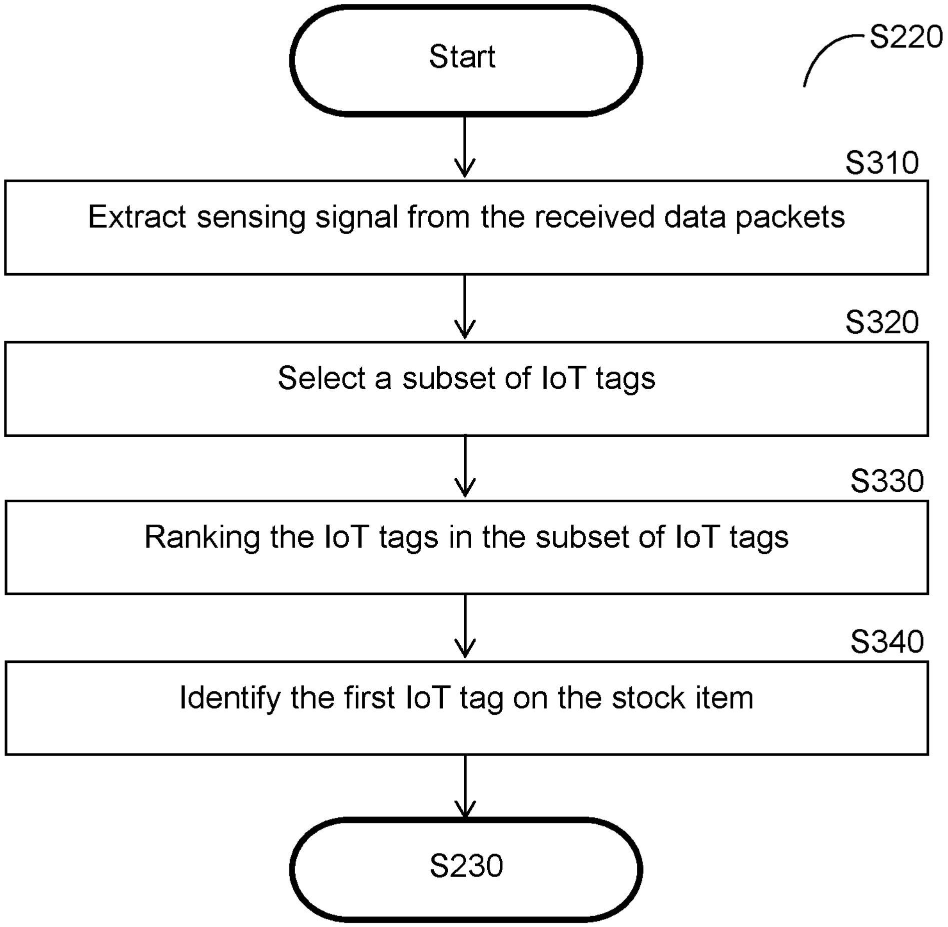
FIG. 3 is a flowchart illustrating a method for identifying a first internet of things (IoT) tag associated with the stock item according to an example embodiment.

FIG. 3 is an example flowchart S220 illustrating a method for identifying a first IoT tag associated with a stock item according to an example embodiment. The first IoT tag is affixed to the stock item of interest and remains in close proximity to a gateway (e.g., the gateway 120, FIG. 1). The stock item may be, for example, but not limited to, an item, a case of items, a pallet of items, and the like, and any combination thereof. The method described herein may be performed by a server, such as the server 140 in FIG. 1.

At S310, sensing signals are extracted from the received data packets. The data packets are received for a plurality of IoT tags that are powered up by the gateway. For each IoT tag, the sensing signals such as, a frequency word, an RSSI, a DCO signal, and the like, and any combination thereof, that provide information about the IoT tag are extracted. In an embodiment, one or more data packets received within a predefined time window (e.g., 30 seconds) may be collected with respect to each IoT tag. Parameters such as, but not limited to, a packet rate, a number of packets per time window, and the like, may be determined. Moreover, statistical analysis of signals of each IoT tag may be performed to determine, for example, average, minimum, maximum, median, and the like.

At S320, a subset of IoT tags is selected from the plurality of IoT tags. The subset is selected based on the data packets received for each of the plurality of IoT tags. In an example embodiment, IoT tags that sent at least a predetermined number of data packets within a predefined time window are selected and included in the subset of IoT tags. As an example, the predetermined number of data packets may be five data packets received within a 30 second time window.

In an embodiment, the subset of IoT tags may not include any IoT tags. In such a case, the operation ends and the first IoT tag is not identified. The IoT tags that send fewer data packets than the predetermined number of data packets may be IoT tags located further away from the gateway and thus irrelevant to the stock item of concern (e.g., stock item picked up to place at the placement point). As an example, data packets may be received from IoT tags affixed to items in the stockroom or other shelves that the gateway and the stock item passes by while moving toward to the placement point.

At S330, the IoT tags in the subset of IoT tags are ranked. The IoT tags are ranked from greatest to lowest signal values for each of the subset of IoT tags. The signal may include, for example, but not limited to, packet rate, number of packets, RSSI, and the like, that are received within the predefined time window. In an example embodiment, the IoT tags may be ranked from highest RSSI to lowest RSSI, where the highest RSSI has the strongest signal strength. A great signal value indicates proximity of the IoT tag to the gateway. In addition, the large signal may indicate continual proximity of the IoT tag with respect to the gateway, for example, based on the number of packets.

At S340, the first IoT tag associated with the stock item is identified. The first IoT tag is selected from the subset of IoT tags as the IoT tag that is affixed to the stock item that is being handled for placement. In an example embodiment, the highest ranked (e.g., the strongest signal strength indicator) IoT tag is identified as the first IoT tag that may be, for example, glued, attached, fastened, and the like, to the stock item. In another example embodiment, an IoT tag with a ranking above a predetermined threshold rank is identified as the first IoT tag. Other sensing signals, parameters, or the like of the IoT tag may also be utilized to identify the first IoT tag. The operation continues to S230 to determine the stock item associated with the identified first IoT tag.

Figure 4:
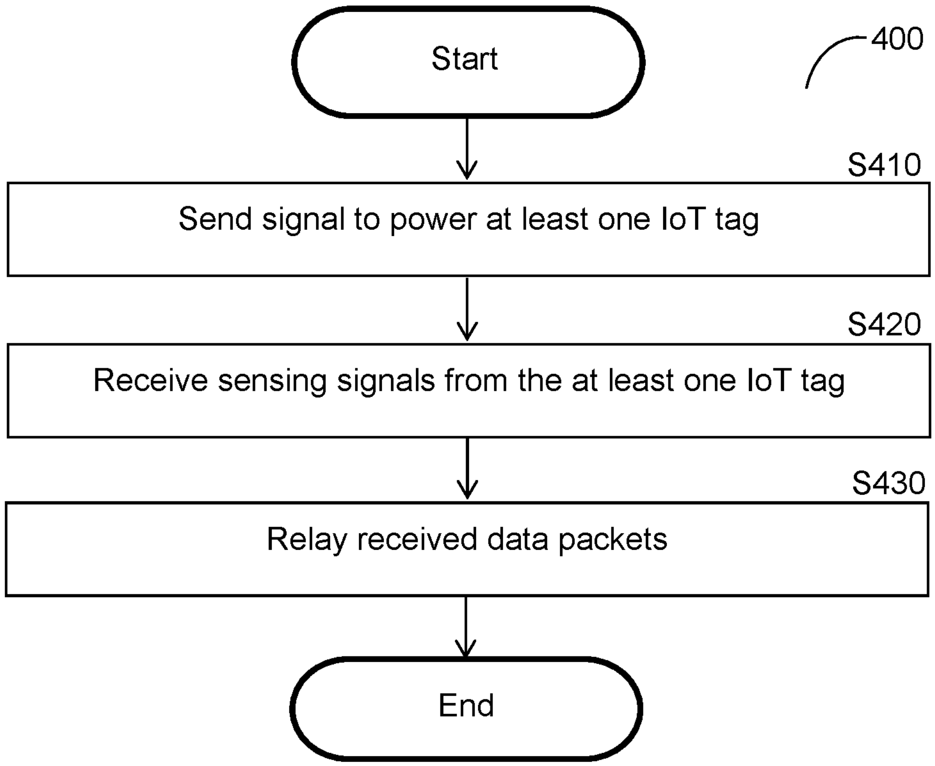
FIG. 4 is a flowchart illustrating a method for collecting and relaying IoT tag signals by a gateway according to one embodiment.

FIG. 4 is an example flowchart 400 illustrating a method for collecting and relaying IoT tag signals by a gateway according to one embodiment. The method described herein may be performed by a gateway, such as the gateway 120 in FIG. 1. The method may be simultaneously performed for one or more gateways that each communicate with at least one IoT tag in its vicinity using a low-power communication protocol. The one or more gateways are configured to relay data packets including IoT tag signals to the server 140, FIG. 1.

In an embodiment, the IoT tag (e.g., the IoT tag 110, FIG. 1) is attached to, for example, an item, a case of items, and the like, and is associated with a specific item to be stocked (i.e., the stock item) at a designated placement point in a space. The association with the specific item is performed prior to the method at, for example, a distribution center.

At S410, signals are sent to power at least one IoT tag. The at least one IoT tag may be a battery-less ambient IoT tag that is configured to harvest energy from ambient electromagnetic signals. In an embodiment, the gateway (e.g., the gateway 120, FIG. 1) is configured to send RF waves to provide power to the at least one IoT tag. In a further embodiment, the signals may be intermittently or periodically sent, thereby conserving power at the gateway and the at least one IoT tag.

At S420, sensing signals are received from the at least one IoT tag. The powered-up IoT tags transmit sensing signals including, but not limited to, a frequency word, a RSSI, a DCO signal, and the like, and any combination thereof. The sensing signals may be transmitted intermittently during a predefined time window, which may further allow conservation of power at the IoT tag. In some implementations, the IoT tag is configured to transmit sensing singles as a response to the power-up signal from the gateway.

At S430, data packets are created and relayed. Additional data such as, but not limited to, a gateway ID, is added to the received sensing signals to create the data packets. The data packets are created for each set of sensing signals received from the at least one IoT tag. It should be noted that one or more data packets may be created for a single IoT tag with the predefined time window. The data packets are relayed to a server in a cloud computing platform (e.g., the server 140 and the cloud computing platform 130, FIG. 1) over the network for further processing. The data packets may be processed in the server to determine the stock item tagged with the IoT tag and is in transport with the gateway, as described above in FIG. 2.

In an embodiment, the data packets may be stored in the database (e.g., the database 145, FIG. 1) with respect to each IoT tag including, for example, a unique IoT tag ID, a time stamp, and the like, and any combination thereof.

In some implementations, data packets may be processed at the gateway, for example, for data cleaning, data enrichment, or the like, prior to sending the data packets to the cloud computing platform (e.g., the cloud computing platform 130, FIG. 1). In some other implementations, a portion or all data packet processing (e.g., S220 through S230, FIG. 1) may be performed at the gateway to identify the first IoT tag and the associated stock item. In such a scenario, the cloud computing platform may be utilized for causing determination of placement point and output of the notification at the placement point designated for the stock item.

Figure 5:
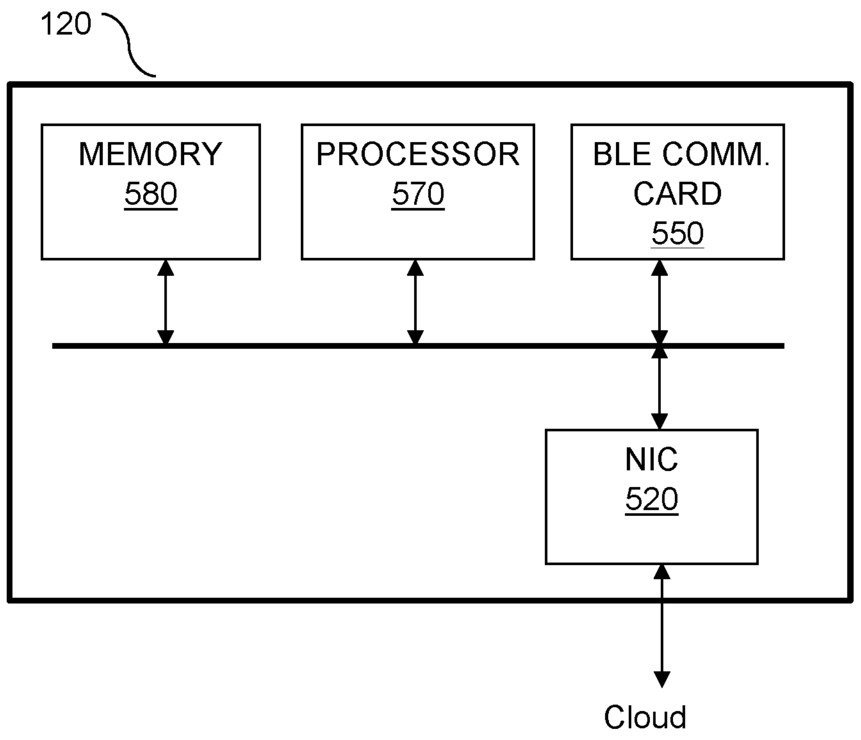
FIG. 5 is a schematic diagram of a gateway used for detecting items using low energy sensing according to an embodiment.

FIG. 5 is an example schematic diagram of the gateway 120 according to an embodiment. The gateway 120 includes a BLE communication card 550 and a network interface card (NIC) 520. In an embodiment, the BLE communication card 550 communicates with the IoT tag 110 over a BLE network (not shown), while the NIC 520 allows communication with the server 140 over the Internet (not shown), or another type of network.

In an embodiment, the gateway 120 may be installed with an agent or application executed by the processor 570 and stored in the memory 580. The agent, when executed, is configured to control the communication with the IoT tag 110 and the server 140.

It should be noted that the processor 570 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 580 may be volatile (e.g., RAM, etc.), non-volatile (e.g., ROM, flash memory, etc.), or a combination thereof. The agent (or application) is realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 570, cause the execution of the agent over the processor 570.

FIG. 6 shows an example schematic diagram of an IoT tag 110, designed according to the disclosed embodiments. The form factor of the IoT tag 110 is an on-die package-less tag. The IoT tag 110, as schematically demonstrated in FIG. 6, includes an energy harvester (harvester) 601, coupled to an on-die capacitor 602 and an external passive capacitor 602', a power management unit (PMU) 603, a microcontroller 604, a system on chip (SoC) 605, and a retention memory 606. The IoT tag 110 further may include at least one antenna 610 glued to a substrate 620, for example. In another embodiment, the antenna 610 may be printed or etched onto the substrate 620. In a further embodiment, a passive external capacitor may take the place of the antenna 610. In an embodiment, substrate 620 is made of a low-cost material, such as, but not limited to, polyethylene (PET), polyimide (PI), and polystyrene (PS). In another embodiment, the substrate's 620 patterns (layout) can be any of aluminum, copper, or silver. The glue utilized to glue the die and/or antenna 610 may include materials such as an anisotropic conductive film (ACP), any type of conductive glue, solder paste, and the like.

In the embodiment shown in FIG. 6, the antenna 610 is coupled to the harvester 601 and may be utilized for energy harvesting as well as wireless communication. In some embodiments, multiple antennas may be utilized to harvest energy at multiple frequency bands. Other embodiments may include one or more antennas for energy harvesting and an antenna to receive/transmit wireless signals at the BLE frequency band. In some embodiments, the IoT tag includes a printed battery.

The SoC 605 includes a number of execution functions realized as analog circuits, digital circuits, or both. Examples of such execution functions are provided below. The SoC 605 is also configured to carry out processes independently or under the control of the microcontroller 604. Each process carried out by the SoC 605 also has a state, and processes can communicate with other processes through an IPC protocol. In the configuration illustrated in FIG. 6, the SoC 605 and/or the microcontroller 604 load the context of processes and reads data from the retention memory 606.

The SoC 605 is partitioned into multiple power domains. Each power domain is a collection of gates powered by the same power and ground supply. To reduce the power consumption, only one power domain is turned on during execution. The SoC 605 can perform functions, such as reading from and writing to memory, e.g., of peripherals, and can execute simple logic operations; tracking power level of the SoC 605; generating and preparing data packets for transmission; cyclic redundancy check (CRC) code generation; packet whitening; encrypting/decrypting and authentication of packets; converting data from parallel to serial; and staging the packet bits to the analog transmitter path for transmission.

In a preferred embodiment, the SoC 605 includes an oscillator calibration circuit (OCC) 605-A. The OCC 605-A includes at least one frequency locking circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using frequency locked loop (FLL), a phased locked loop (PLL), and a delay locked loop (DLL). An example implementation of an oscillator calibration circuit 605-A is discussed in U.S. Pat. No. 10,886,929, assigned to the common assignee Yehezkely, and incorporated herein by reference.

According to the disclosed embodiments, the energy harvester 601, the capacitor 602, PMU 603, microcontroller 604, SoC 605, and retention memory 606 are integrated in a die 630. The die 630 is glued to the substrate 620. The IoT tag 110 does not include any external DC power source, such as a battery.

In an embodiment, the microcontroller 604 implements electronic circuits (such as, memory, logic, RF, etc.) performing various functions allowing communication using a low energy (power) communication protocol. Examples for such a protocol includes, but are not limited to, Bluetooth®, LoRa, Wi-Gi®, nRF, DECT®, Zigbee®, Z-Wave, EnOcean, and the like. In a preferred embodiment, the microcontroller 604 operates using a Bluetooth Low Energy (BLE) communication protocol.

In some embodiments, the microcontroller 604 is integrated with wireless sensors (not shown) to complete an IoT device's functionality.

The harvester 601 is configured to provide multiple voltage levels to the microcontroller 604, while maintaining a low loading DC dissipation value. In an example implementation, the energy harvester 601 may include a voltage multiplier coupled to the antenna 610. The voltage multiplier may be a Dickson multiplier, while the antenna 610 is a receive/transmit antenna of the microcontroller 604. That is, in such a configuration, the antenna is primarily designed to receive and/or transmit wireless signals according to the respective communication protocol of the low-energy IoT tag 110 (e.g., 2.400-2.4835 GHz signal for BLE communication).

It should be noted that the antenna 610 may also be designed for energy harvesting and may operate on a different frequency band, direction, or both, than those defined in the standard of the respective communication protocol. Regardless of the configuration, energy can be harvested from any wireless signals received over the air. Alternatively, energy can be harvested from any other sources, such as solar, piezoelectric signals, and the like.

The harvested energy is stored in the on-die capacitor 602 and/or the external capacitor 602'. The PMU 603 is coupled to the capacitor 602 and is configured to regulate the power to the microcontroller 604 and SoC 605. Specifically, as the capacitance of the capacitor 602 is very limited, the power consumption should be carefully maintained. This maintenance is performed to avoid draining of the capacitor 602, thus resetting the microcontroller 604. The PMU 603 can be realized using a Schmitt trigger that operates on a predefined threshold (Vref), e.g., Vref=0.85V.

In another embodiment, the PMU 603 may be further configured to provide multi-level voltage level indications to the microcontroller 604. Such indications allow the microcontroller 604 to determine the state of a voltage supply at any given moment when the capacitor 602 charges or discharges. According to this embodiment, the PMU 603 may include detection circuitry controlled by a controller. The detection circuity includes different voltage reference threshold detectors, where only a subset of such detectors is active at a given time to perform the detection.

The IoT tag 110 does not include any crystal oscillator providing a reference clock signal. According to an embodiment, the reference clock signal is generated using over-the-air signals received from the antenna 610. As noted above, in a typical deployment, a free-running oscillator is locked via a Phase-Locked Loop (PLL) to a clock, originating from a crystal oscillator. According to the disclosed embodiments, the OCC 605-A calibrates the frequency of an oscillator using an over-the-air reference signal. The oscillator(s) implemented in the tag are on-die oscillators and may be realized as a digitally controlled oscillator (DCO).

The retention memory 606 is a centralized area that is constantly powered. Data to be retained during low power states is located in the retention memory 606. In an embodiment, the retention area is optimized to subthreshold or near threshold voltage, e.g., 0.3V-0.4V. This allows for the reduction of the leakage of the retention cells.

Figure 7:
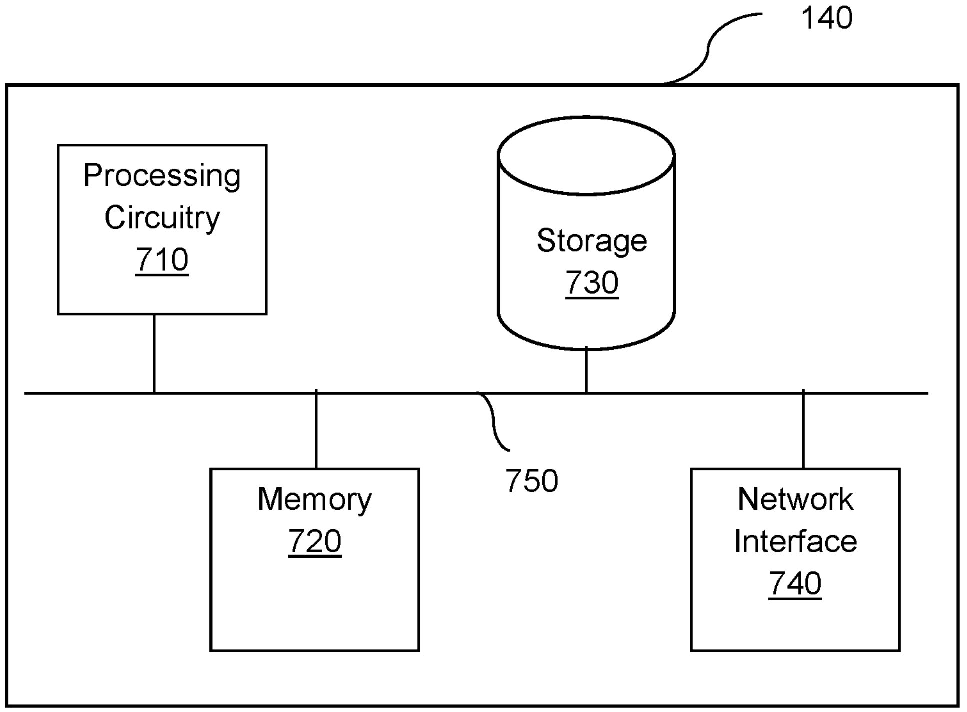
FIG. 7 is a schematic diagram of a server according to an embodiment.

FIG. 7 is an example schematic diagram of a server 140 according to an embodiment. The server 140 includes a processing circuitry 710 coupled to a memory 720, a storage 730, and a network interface 740. In an embodiment, the components of the server 140 may be communicatively connected via a bus 750.

The processing circuitry 710 may be realized as one or more hardware logic components and circuits, examples of which are provided above.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, CD-ROM, Digital Versatile Disks (DVDs), or any other medium which can be used to store the desired information.

The network interface 740 allows the server 140 to communicate with the gateways (e.g., gateways 120, FIG. 2) and with the notification device (e.g., notification device 170, FIG. 1) for the purpose of, for example, receiving data, sending data, and the like. Further, the network interface 740 allows the server 140 to communicate with the IoT tag 110 for the purpose of collecting frequency words.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for passively determining a stock item and placing the stock item using an internet of things (IoT) tag, comprising:

receiving, during a predefined time window, data packets from a gateway that is transported with the stock item, wherein the received data packets include at least a sensing signal from a plurality of IoT tags;

identifying, based on the received data packets, a first IoT tag affixed to the stock item from the plurality of IoT tags having a signal strength indicator above a predetermined threshold rank;

identifying an identification of the stock item associated with the first IoT tag by applying a machine learning algorithm on the received data packets of the identified first IoT tag;

causing determination of a placement point to place the identified stock item; and causing initiation of a notification via a notification device, wherein the notification device is located at the determined placement point for the stock item.

2. The method of claim 1, wherein the notification is output using at least one of: light and sound.

3. The method of claim 1, further comprising:

selecting a subset of IoT tags from the plurality of IoT tags, wherein the subset of IoT tags includes at least one IoT tag that received at least a predetermined number of data packets within the predefined time window; and ranking the at least one IoT tag of the subset of IoT tags based on the signal strength indicator of the at least one sensing signal.

4. The method of claim 3, wherein the first IoT tag from the plurality of IoT tags has a strongest signal strength indicator from the ranked at least one IoT tag of the subset of IoT tags.

5. The method of claim 1, wherein the at least a sensing signal includes at least one of: a frequency word, a received signal strength indicator (RSSI), and a digitally controlled oscillator (DCO) signal.

6. The method of claim 1, wherein an IoT tag of the plurality of IoT tags is a battery-less IoT tag harvesting energy from a radio frequency (RF) from the gateway.

7. The method of claim 1, wherein the gateway is a portable device configured to communicate with the plurality of IoT tags via a Low-Energy short range communication protocol.

8. The method of claim 1, wherein the gateway is in proximity to the first IoT tag that is attached to the stock item.

9. A non-transitory computer readable medium having stored thereon instructions for causing a processing circuitry to execute a process, the process comprising:

receiving, during a predefined time window, data packets from a gateway that is transported with a stock item, wherein the received data packets include at least a sensing signal from a plurality of IoT tags;

identifying, based on the received data packets, a first IoT tag affixed to the stock item from the plurality of IoT tags having a signal strength indicator above a predetermined threshold rank;

identifying an identification of the stock item associated with the first IoT tag by applying a machine learning algorithm on the received data packets of the identified first IoT tag;

causing determination of a placement point to place the identified stock item; and causing initiation of a notification via a notification device, wherein the notification device is located at the determined placement point for the stock item.

10. A system for passively determining a stock item and placing the stock item using an internet of things (IoT) tag, comprising:

a processing circuitry; and a memory, the memory containing instructions that, when executed by the processing circuitry, configure the system to:

receive, during a predefined time window, data packets from a gateway that is transported with the stock item, wherein the received data packets include at least a sensing signal from a plurality of IoT tags;

identify, based on the received data packets, a first IoT tag affixed to the stock item from the plurality of IoT tags having a signal strength indicator above a predetermined threshold rank;

identify an identification of the stock item associated with the first IoT tag by applying a machine learning algorithm on the received data packets of the identified first IoT tag;

cause determination of a placement point to place the identified stock item; and cause initiation of a notification via a notification device, wherein the notification device is located at the determined placement point for the stock item.

11. The system of claim 10, wherein the notification is output using at least one of: light and sound.

12. The system of claim 10, wherein the system is further configured to:

select a subset of IoT tags from the plurality of IoT tags, wherein the subset of IoT tags includes at least one IoT tag that received at least a predetermined number of data packets within the predefined time window; and rank the at least one IoT tag of the subset of IoT tags based on the signal strength indicator of the at least one sensing signal.

13. The system of claim 12, wherein the first IoT tag from the plurality of IoT tags has a strongest signal strength indicator from the ranked at least one IoT tag of the subset of IoT tags.

14. The system of claim 10, wherein the at least a sensing signal includes at least one of: a frequency word, a received signal strength indicator (RSSI), and a digitally controlled oscillator (DCO) signal.

15. The system of claim 10, wherein an IoT tag of the plurality of IoT tags is a battery-less IoT tag harvesting energy from a radio frequency (RF) from the gateway.

16. The system of claim 10, wherein the gateway is a portable device configured to communicate with the plurality of IoT tags via a Low-Energy short range communication protocol.

17. The system of claim 10, wherein the gateway is in proximity to the first IoT tag that is attached to the stock item.

* * * * *